United States Patent
Fu et al.

(10) Patent No.: US 11,457,076 B2
(45) Date of Patent: Sep. 27, 2022

(54) USER PROFILE CREATION FOR SOCIAL NETWORKS

(71) Applicant: KYNDRYL, INC., New York, NY (US)

(72) Inventors: Yan Bin Fu, Ningbo (CN); Qing Jun Gao, Beijing (CN); Shuang Yin Liu, Beijing (CN); Wen Wang, Beijing (CN); Yi Wu, Ningbo (CN)

(73) Assignee: KYNDRYL, INC., New York, NY (US)

(*) Notice: Subject to any disclaimer, the term of this patent is extended or adjusted under 35 U.S.C. 154(b) by 607 days.

(21) Appl. No.: 15/813,949

(22) Filed: Nov. 15, 2017

(65) Prior Publication Data
US 2019/0149630 A1    May 16, 2019

(51) Int. Cl.
*G06Q 50/00* (2012.01)
*H04L 67/306* (2022.01)
*G06F 16/9535* (2019.01)

(52) U.S. Cl.
CPC ........ *H04L 67/306* (2013.01); *G06F 16/9535* (2019.01); *G06Q 50/01* (2013.01)

(58) Field of Classification Search
CPC .................................................... G06Q 50/01
See application file for complete search history.

(56) References Cited

U.S. PATENT DOCUMENTS

| | | | |
|---|---|---|---|
| 9,424,491 B1 | 8/2016 | Kirkham et al. | |
| 2008/0070593 A1* | 3/2008 | Altman | H04W 4/029 455/457 |
| 2011/0184814 A1* | 7/2011 | Konkol | G06Q 30/0273 705/14.69 |
| 2013/0117692 A1* | 5/2013 | Padmanabhan | H04N 21/4126 715/753 |
| 2013/0212173 A1* | 8/2013 | Carthcart | G06Q 50/01 709/204 |
| 2014/0250182 A1 | 9/2014 | Klemm et al. | |
| 2014/0279722 A1* | 9/2014 | Singh | G06N 5/022 706/11 |
| 2014/0372358 A1* | 12/2014 | Zhou | G06Q 10/06398 706/46 |
| 2016/0132972 A1* | 5/2016 | Fetzer | G06Q 50/01 705/319 |
| 2016/0170991 A1* | 6/2016 | Birchall | H04L 12/1859 707/751 |
| 2016/0224871 A1* | 8/2016 | Koren | G06K 9/6284 |
| 2018/0253193 A1* | 9/2018 | Zeng | H04L 67/306 |

FOREIGN PATENT DOCUMENTS

| | | | | |
|---|---|---|---|---|
| KR | 10-2017-0054409 | * | 4/2017 | |
| WO | WO-2013114212 A2 | * | 8/2013 | ....... G06F 17/30268 |

OTHER PUBLICATIONS

Pakistan: Klik—photography and tagging friends made easy. (May 28, 2012). Right Vision News Retrieved from https://dialog.proquest.com/professional/docview/1016727444?accountid=131444 (Year: 2012).*

* cited by examiner

*Primary Examiner* — Lynda Jasmin
*Assistant Examiner* — Maame Ofori-Awuah
(74) *Attorney, Agent, or Firm* — Erik Swanson; Andrew M. Calderon; Roberts Calderon Safran & Cole, P.C.

(57) ABSTRACT

Updating a user social network profile of a user based on relevant activities posted by other users in a same social network.

12 Claims, 3 Drawing Sheets

USER PROFILE CREATION FOR SOCIAL NETWORKS

BACKGROUND

The present invention relates to social networking, and more specifically to creation of user profiles for social networks.

User Profiles have become popular in social networks with the boom in social platforms and the richness of users' social network posts. In a nutshell, it's a process to collect information that a user exposed to extract his/her social attributes. For example, a user with many tourist relevant posts is described with attributes like traveling, traveling type, countries traveled, companion, etc. Currently, the process to generate user social network profile is mostly based on direct information the user exposed, including literal and pictorial information. This method faces challenges as following:

1. User-provided information and user posts are selected, thus the profile is not comprehensive enough.
2. User-posted activities are one-sided, thus the profile is not reliable enough.
3. Some social network users rarely post, making it difficult to extract their profile.

SUMMARY

According to one embodiment of the present invention, a method of updating a user social network profile of a user based on relevant activities posted by other users in a same social network is disclosed. The method comprising the steps of: a computer collecting profile information from the user for the user social network profile comprising at least an image of the user; the computer locating social network friends of the user; the computer collecting social network posts by the social network friends of the user; the computer identifying posts through facial image recognition by the social network friends which have images containing the user based on the image of the user in the user social network profile; the computer deriving information from the social network posts by the social network friends for inclusion in the user social network profile; the computer combining the information collected from the user and information derived from the social network posts by the social network friends which were identified as containing the user to build a combined user profile; and the computer updating the user social network profile with the combined user profile.

According to another embodiment of the present invention, a computer program product for updating a user social network profile of a user based on relevant activities posted by other users in a same social network is disclosed. The computer program product being executed by a computer comprising at least one processor, one or more memories, one or more computer readable storage media, the computer program product comprising a computer readable storage medium having program instructions embodied therewith. The program instructions executable by the computer to perform a method comprising: collecting, by the computer, profile information from the user for the user social network profile comprising at least an image of the user; locating, by the computer, social network friends of the user; collecting, by the computer, social network posts by the social network friends of the user; identifying, by the computer, posts through facial image recognition by the social network friends which have images containing the user based on the image of the user in the user social network profile; deriving, by the computer, information from the social network posts by the social network friends for inclusion in the user social network profile; combining, by the computer, the information collected from the user and information derived from the social network posts by the social network friends which were identified as containing the user to build a combined user profile; and updating, by the computer, the user social network profile with the combined user profile.

According to another embodiment of the present invention, a computer system for updating a user social network profile of a user based on relevant activities posted by other users in a same social network is disclosed. The computer system comprising a computer comprising at least one processor, one or more memories, one or more computer readable storage media having program instructions executable by the computer to perform the program instructions. The program instructions comprising: collecting, by the computer, profile information from the user for the user social network profile comprising at least an image of the user; locating, by the computer, social network friends of the user; collecting, by the computer, social network posts by the social network friends of the user; identifying, by the computer, posts through facial image recognition by the social network friends which have images containing the user based on the image of the user in the user social network profile; deriving, by the computer, information from the social network posts by the social network friends for inclusion in the user social network profile; combining, by the computer, the information collected from the user and information derived from the social network posts by the social network friends which were identified as containing the user to build a combined user profile; and updating, by the computer, the user social network profile with the combined user profile.

DETAILED DESCRIPTION

Figure 1:
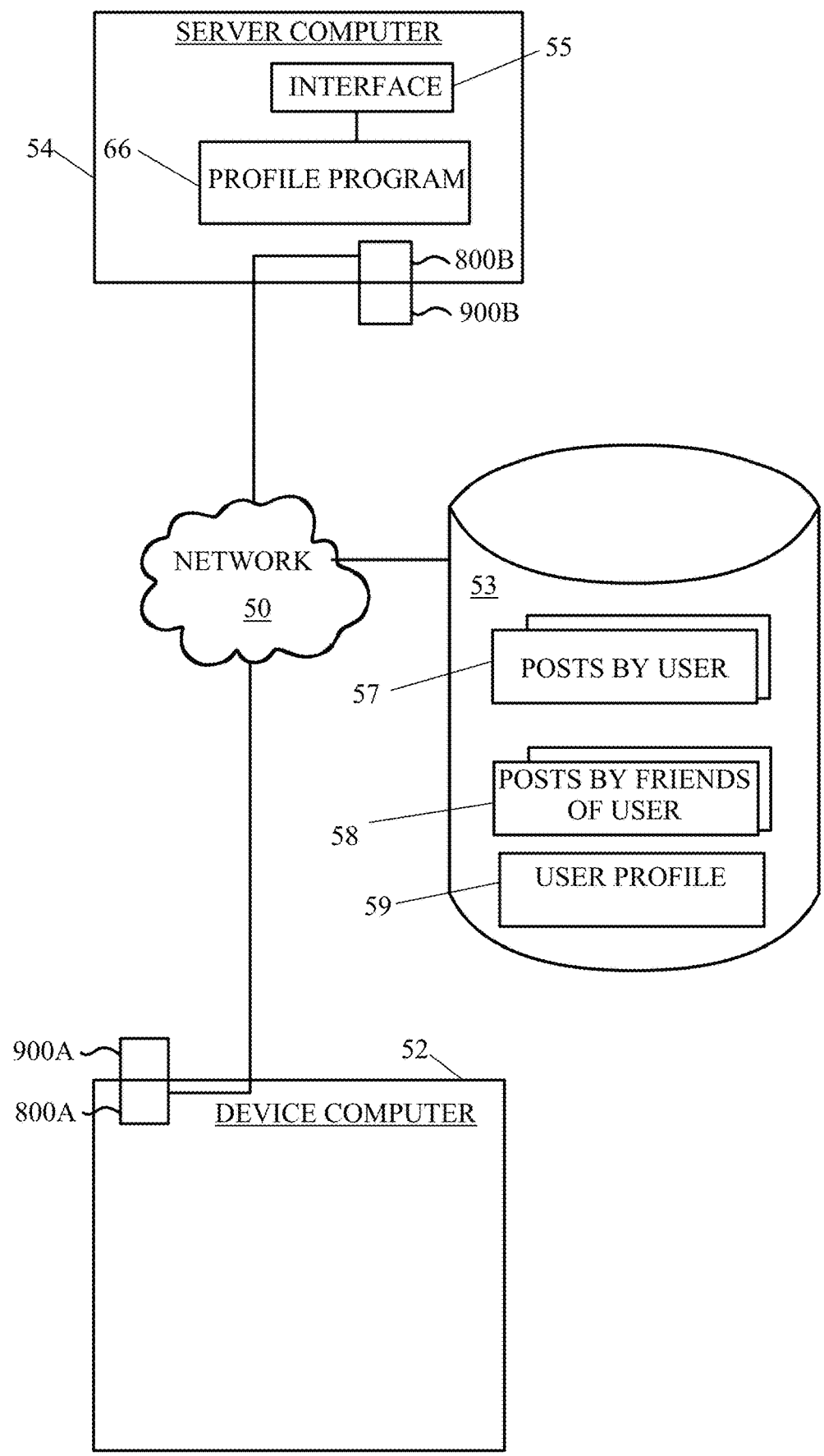
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding posts, "likes", "dislikes", "reacts to", check ins to a specific location, user profile information and other information which might also include, for example, the user's age, gender, education, residence, occupation, work experience, favorite music and books and brands, and so on. The interface can be, for example, a command line interface, a graphical user interface (GUI), a natural user interface (NUI) or a touch user interface (TUI). The device computer 52 includes a set of internal components 800a and a set of external components 900a, further illustrated in FIG. 3.

Figure 3:
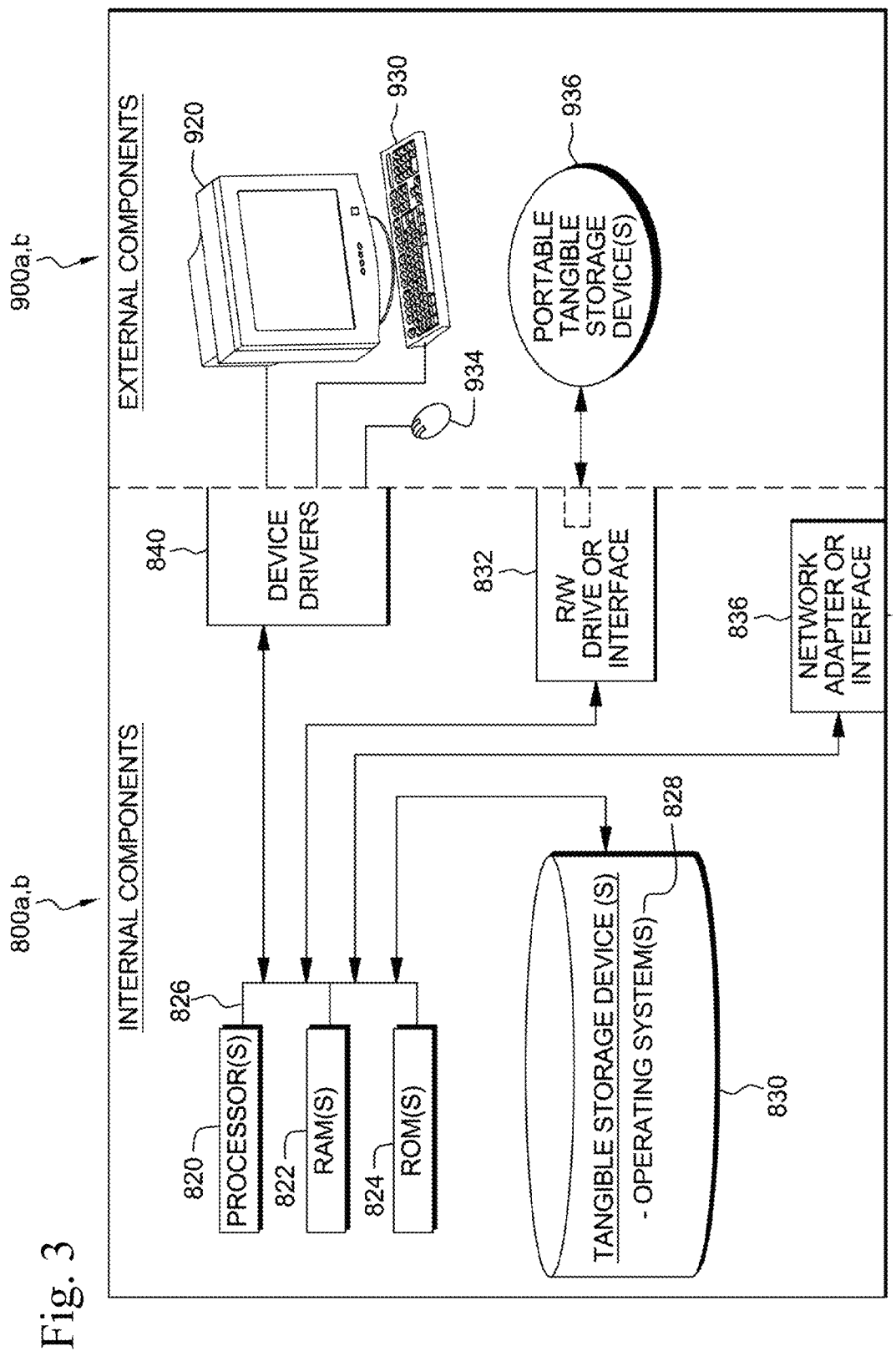
FIG. 3 illustrates internal and external components of a client computer and a server computer in which illustrative embodiments may be implemented.

Server computer 54 includes a set of internal components 800b and a set of external components 900b illustrated in FIG. 3. In the depicted example, server computer 54 provides information, such as boot files, operating system images, and applications to the device computer 52. Server computer 54 can compute the information locally or extract the information from other computers on network 50. The server computer 54 preferably contains a profile program 66.

Repository 53 may contain social network posts made by the user 57, posts by a friend(s) of the user 58, and a user profile 59. Posts can be any comment, reaction, image or any other expression regarding a subject made by a user and sent to the social network.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
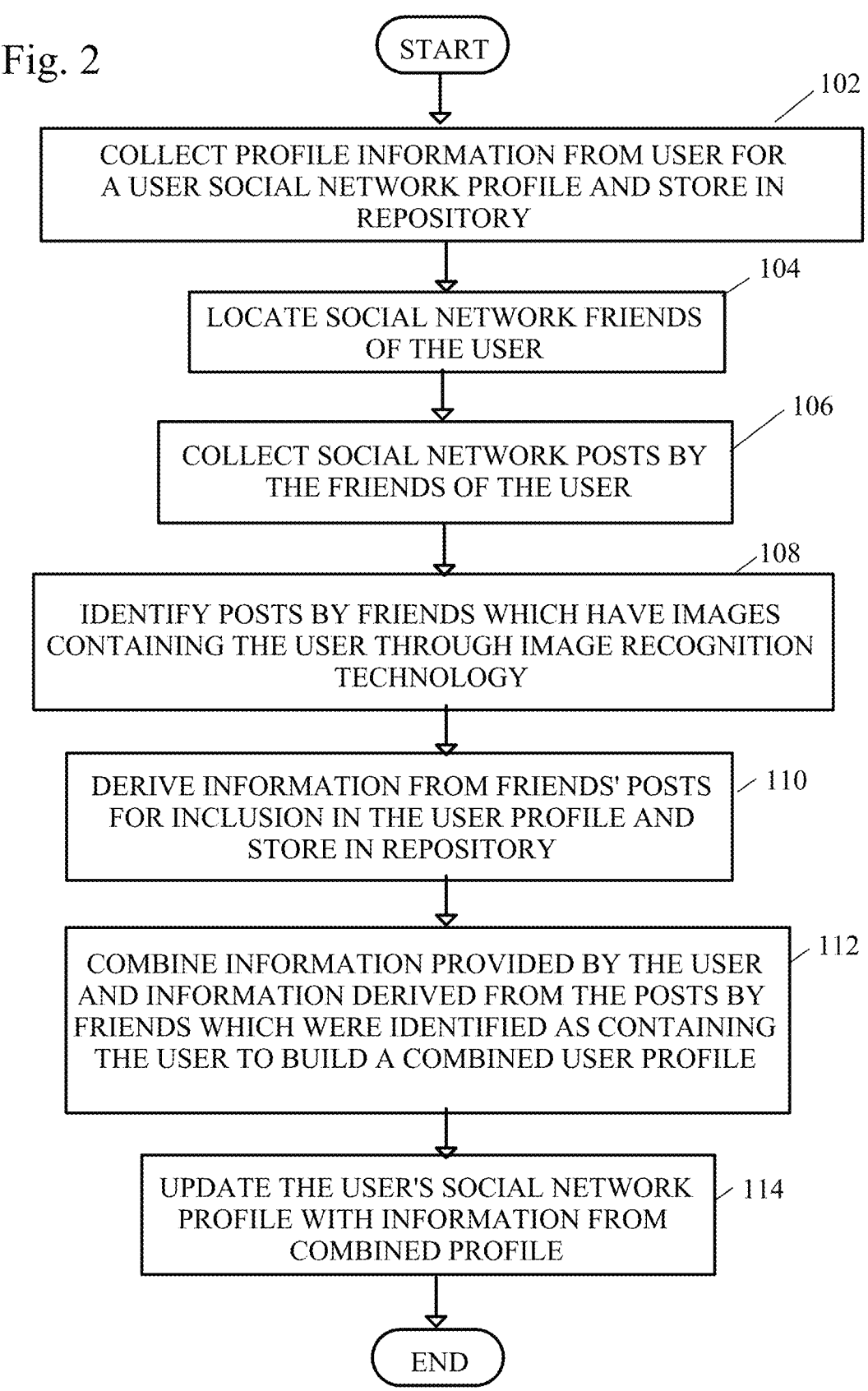
FIG. 2 shows a diagram of a flowchart of updating a user social network profile based on relevant activities posted by other people in the same social network.

FIG. 2 shows a diagram of a flowchart of replenishing user social network profile based on relevant activities posted by other people in the same network.

In a first step, the profile program 66 collects profile information from a user for a user social network profile and stores the user social network profile in a repository (step 102), for example repository 53.

The user social network profile information is initially based on the information the user provided as his or her profile when the user's social network account was set up, and as updated by the user from time to time. The user profile information for use in this method comprises, at a minimum, an image of the user or information sufficient to allow the method's image recognition step to recognize the user in an image. This information might also include, for example, the user's age, the user's gender, the user's education, the user's residence city, state and/or country, the user's occupation, the user's work experience, the user's favorite music and books and brands, and so on.

Optionally, the method may also collect profile information derived from posts by the user. This information might include, for example, locations the user has checked in from, hobbies the user engages in, groups the user belongs to, pages the user frequents, posts by others which the user "likes" or "reacts to". The term "like" used here means that the user has provided an expression of support for content in the post through the social network. Alternatively, it can include any posts in which the user has expressed any reaction to.

The collected information is stored in a repository.

Next, the profile program 66 locates social network friends of the user. The social network friends of the user preferably have a high social correlation with the user (step 104). A social network friend is a person which is connected to the user through the social network which both the user and the person endorse the relationship.

The user's friends can usually be determined from the social network, as these are usually publically displayed on the user's home page.

The social correlation between the user and the friends may be determined by comparing the profile of the user to that of the friends, or by the number of friends the user has in common with each of the other friends, or by other methods known to the art. For example, the method could define friends with "high social correlation" as being those people listed as friends of the user who have at least five friends in common with the user.

Therefore, the social correlation could be determined by comparing the user social network profile of the user to user profiles of friends to determine a number of friends the user has in common with each of the friends and if the number of friends in common is greater than a threshold, determining that the friend has a high social correlation with the user.

The profile program 66 then collects social network posts by the friends of the user (step 106).

The profile program 66 would access the social media posts for each of the friends which were located in step 104, above. The posts can be stored in a repository, for example repository 53, for subsequent processing of all of the collected posts in the next step, or, optionally, the posts can be processed "on the fly" or in real time, with each post being subjected to the processing in the next step, and then only those posts which are extracted in that step are selected for further processing.

Optionally, the friends' posts might be first reviewed to extract only those posts which contain images, so as to reduce the number of posts which need to be subjected to image recognition in the next step.

The profile program 66 identifies posts by friends which have images containing the user through image recognition technology (step 108).

Image recognition technology is used to analyze the images in the collected posts by friends, identifying those posts which contain images of the user. If the posts by friends which were collected in the previous step were stored in a repository, this step could be performed on the stored posts in the repository 53, and either the stored posts which do not contain the image of the user would be deleted from the repository, or those which do contain the image of the user could be flagged or copied to another repository. Alternatively, this step could be combined with the previous step, and only those posts which contain images of the user would be stored in the repository for processing in the next step.

The image recognition technology can be any such technology known to the art. For example, some social networks such as Facebook® have the ability to automatically suggest identifications of people in images for tagging when they are posted. Tagging can be a keyword added to a social media post with the original purpose of categorizing related content or alternatively a tag can also refer to the act of tagging someone in a post, which creates a link to their social media profile and associates them with the content.

The profile program 66 derives information from the friend's posts for inclusion in the user's social network profile and stores the derived information in a repository (step 110).

The friends' posts which include images of the user, which were identified in the previous step (step 108), are then analyzed to derive information which can be included in the user's profile and stores the derived information in the repository, for example repository 53.

This information could include, for example, locations identified in the posts (for example, the user is shown in many images in Scotland, therefore the user has traveled to Scotland), characteristics of the locations identified in the posts (for example, if many of the locations are airports or airplane cockpits, the user might be a pilot), hobbies or other activities being engaged in by the user in the posts (for example, if the user is often shown with a choir he is probably a member of the choir or enjoys singing), other people tagged in the images (for example, if the user is shown with celebrities or politicians, they might be in the movie business or active in politics), or preferences in food or clothing (if the user is often shown in Indian restaurants, they might like Indian food), and so on.

Optionally, this step might be combined with the previous two steps, so that rather than storing posts in a repository, the posts are processed "on the fly" or in real time and only the derived information is stored in a repository, for example repository 53.

The profile program 66 combines information provided by the user and information derived from the posts by friends which were identified as containing the user to build a combined user profile (step 112).

The user-provided information from the repository 53 is combined with the friends-derived information from the repository 53 to form a combined profile.

The profile program 66 updates the user's social network profile with information from the combined user profile (step 114) and the method ends.

The existing user profile on the social network can be replaced by the combined profile, or the information in the combined profile can be compared with the information in the existing profile, and information can then be added as needed.

FIG. 3 illustrates internal and external components of a device computer 52 and server computer 54 in which illustrative embodiments may be implemented. In FIG. 3, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and profile program 66 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Profile program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Profile program 66 can be downloaded to the device computer 52 and server computer 54 from an external computer via a network (for example, the Internet, a local area network or other, wide area network) and network adapter or interface 836. From the network adapter or interface 836, profile program 66 is loaded into hard drive 830. Profile program 66 can be downloaded to the server computer 54 from an external computer via a network (for example, the Internet, a local area network or other, wide area network) and network adapter or interface 836. From the network adapter or interface 836, profile program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Profile program 66 can be written in various programming languages including low-level, high-level, object-oriented or non object-oriented languages. Alternatively, the functions of a profile program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method updating a user social network profile of a user based on relevant activities posted by other users in a same social network comprising the steps of:

a computer collecting profile information from the user for the user social network profile comprising at least an image of the user;

the computer determining social network friends of the user by determining which social network friends have a high social correlation with the user, wherein the high social correlation is determined by the computer comparing the user social network profile of the user to user profiles of social network friends to determine a number of friends the user has in common with each of the social network friends and determining that a social network friend has a high social correlation with the user when the number of friends in common is greater than a threshold;

the computer collecting social network posts by the social network friends of the user containing images;

the computer identifying images within the social network posts by the social network friends of the user through facial image recognition which have images containing the user based on the image of the user in the user social network profile;

the computer determining information from the identified images containing the user within the social network posts by the social network friends of the user for inclusion in the user social network profile;

the computer generating a combined user profile with the profile information collected from the user and information from the identified images within the social network posts by the social network friends which were identified as containing the user; and the computer updating the user social network profile with the combined user profile.

2. The method of claim 1, wherein the profile information from the user includes at least information regarding the user selected from the group consisting of the user's age, user's gender, user's education, user's residence city, user's occupation, user's work experience, and user's favorite music and books and brands.

3. The method of claim 1, wherein profile information collected from the user further includes information derived from posts by the user to the social network.

4. The method of claim 3, wherein information determined from posts by the user to the social network is selected from the group consisting of locations the user has checked in from, hobbies the user engages in, groups the user belongs to, web pages the user frequents, and posts by others which the user has provided a reaction to.

5. A computer program product for updating a user social network profile of a user based on relevant activities posted by other users in a same social network by a computer comprising at least one processor, one or more memories, one or more computer readable storage media, the computer program product comprising a computer readable storage medium having program instructions embodied therewith, the program instructions executable by the computer to perform a method comprising:

collecting, by the computer, profile information from the user for the user social network profile comprising at least an image of the user;

determining, by the computer, social network friends of the user by determining which social network friends have a high social correlation with the user, wherein the high social correlation is determined by the computer comparing the user social network profile of the user to user profiles of social network friends to determine a number of friends the user has in common with each of the social network friends and determining that a social network friend has a high social correlation with the user when the number of friends in common is greater than a threshold;

collecting, by the computer, only social network posts by the social network friends of the user containing images;

identifying, by the computer, images within the social network posts by the social network friends of the user through facial image recognition which have images containing the user based on the image of the user in the user social network profile;

determining, by the computer, information from the identified images containing the user within the social network posts by the social network friends of the user for inclusion in the user social network profile;

generating, by the computer, a combined user profile with the profile information collected from the user and information from the identified images within the social network posts by the social network friends which were identified as containing the user; and updating, by the computer, the user social network profile with the combined user profile.

6. The computer program product of claim 5, wherein the profile information from the user includes at least information regarding the user selected from the group consisting of the user's age, user's gender, user's education, user's residence city, user's occupation, user's work experience, and user's favorite music and books and brands.

7. The computer program product of claim 5, wherein profile information collected from the user further includes information derived from posts by the user to the social network.

8. The computer program product of claim 7, wherein information determined from posts by the user to the social network is selected from the group consisting of locations the user has checked in from, hobbies the user engages in, groups the user belongs to, web pages the user frequents, and posts by others which the user has provided a reaction to.

9. A computer system for updating a user social network profile of a user based on relevant activities posted by other user in a same social network comprising a computer comprising at least one processor, one or more memories, one or more computer readable storage media having program instructions executable by the computer to perform the program instructions comprising:

collecting, by the computer, profile information from the user for the user social network profile comprising at least an image of the user;

determining, by the computer, social network friends of the user by determining which social network friends have a high social correlation with the user, wherein the high social correlation is determined by the computer comparing the user social network profile of the user to user profiles of social network friends to determine a number of friends the user has in common with each of the social network friends and determining that a social network friend has a high social correlation with the user when the number of friends in common is greater than a threshold;

collecting, by the computer, only social network posts by the social network friends of the user containing images;

identifying, by the computer, images within the social network posts by the social network friends of the user through facial image recognition which have images containing the user based on the image of the user in the user social network profile;

determining, by the computer, information from the identified images containing the user within the social network posts by the social network friends of the user for inclusion in the user social network profile;

generating, by the computer, a combined user profile with the profile information collected from the user and information from the identified images within the social network posts by the social network friends which were identified as containing the user; and updating, by the computer, the user social network profile with the combined user profile.

10. The computer system of claim 9, wherein the profile information from the user includes at least information regarding the user selected from the group consisting of the user's age, user's gender, user's education, user's residence city, user's occupation, user's work experience, and user's favorite music and books and brands.

11. The computer system of claim 9, wherein profile information collected from the user further includes information derived from posts by the user to the social network.

12. The computer system of claim 11, wherein information determined from posts by the user to the social network is selected from the group consisting of locations the user has checked in from, hobbies the user engages in, groups the user belongs to, web pages the user frequents, and posts by others which the user has provided a reaction to.

\* \* \* \* \*